(12) United States Patent
Shinozaki et al.

(10) Patent No.: US 10,608,677 B2
(45) Date of Patent: Mar. 31, 2020

(54) HIGH-FREQUENCY FRONT END CIRCUIT AND COMMUNICATION DEVICE INCLUDING THE SAME

(71) Applicant: Murata Manufacturing Co., Ltd., Kyoto (JP)

(72) Inventors: Takayuki Shinozaki, Kyoto (JP); Hidenori Obiya, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/275,759

(22) Filed: Feb. 14, 2019

(65) Prior Publication Data

US 2019/0273519 A1 Sep. 5, 2019

(30) Foreign Application Priority Data

Mar. 1, 2018 (JP) .................................. 2018-037011
Jan. 8, 2019 (JP) .................................. 2019-001264

(51) Int. Cl.
*H04B 1/48* (2006.01)
*H04B 1/00* (2006.01)

(52) U.S. Cl.
CPC ............. *H04B 1/0057* (2013.01); *H04B 1/48* (2013.01)

(58) Field of Classification Search
CPC ................................. H04B 1/0057; H04B 1/48
See application file for complete search history.

(56) References Cited

U.S. PATENT DOCUMENTS 10,075,199 B2 *  9/2018  King .................... H04B 1/0057
2016/0381649 A1  12/2016  Anthony et al.
2018/0109273 A1 *  4/2018  Talty .................... H04B 1/0039

FOREIGN PATENT DOCUMENTS

JP       2017-17691 A      1/2017
KR   10-2014-0128014 A    11/2014

OTHER PUBLICATIONS

Korean Office Action for Korean Patent Application No. 10-2019-0009001, dated Oct. 29, 2019.

* cited by examiner

*Primary Examiner* — Tuan H Nguyen
(74) *Attorney, Agent, or Firm* — Pearne & Gordon LLP

(57) ABSTRACT

A multiplexer is electrically connectable to an antenna terminal. A first power amplifier is electrically connectable to the multiplexer. A second power amplifier is electrically connectable to the multiplexer. A switch circuit switches between a first route passing through the multiplexer and a second route not passing through the multiplexer. In a high-frequency front end circuit, the first route is formed in a case of a carrier aggregation mode in which the first power amplifier and the second power amplifier are simultaneously used, and the second route is formed in a case of a single mode in which one of the first power amplifier and the second power amplifier is used.

14 Claims, 10 Drawing Sheets

HIGH-FREQUENCY FRONT END CIRCUIT AND COMMUNICATION DEVICE INCLUDING THE SAME

This application claims priority from Japanese Patent Application No. 2018-037011 filed on Mar. 1, 2018, and claims priority from Japanese Patent Application No. 2019-001264 filed on Jan. 8, 2019. The content of these applications are incorporated herein by reference in their entireties.

BACKGROUND

The present disclosure relates to a high-frequency front end circuit and a communication device including the same in general, and more particularly relates to a high-frequency front end circuit capable of supporting carrier aggregation and a communication device including the same.

An existing electronic system using carrier aggregation has been known (see, for example, Japanese Unexamined Patent Application Publication No. 2017-17691).

Japanese Unexamined Patent Application Publication No. 2017-17691 discloses, in FIG. 2C, an electronic system including an antenna, a diplexer, and two power amplifiers (first power amplifier and second power amplifier).

In the electronic system described above, the diplexer is connected to the antenna. Additionally, in the electronic system described above, each of the two power amplifiers is connected to the diplexer with a transmission/reception switch and a filter interposed therebetween.

A high-frequency front end circuit and a communication device including the high-frequency front end circuit are required to perform an operation in a carrier aggregation mode with at least two or more uplinks and an operation in a single mode in some cases. However, the electronic system disclosed in Japanese Unexamined Patent Application Publication No. 2017-17691 has a problem that, in addition to the case where the operation in the carrier aggregation mode is performed, a signal is transmitted through a multiplexer including the diplexer and the like when the operation in the single mode is performed as well, insertion loss in the multiplexer is therefore large when the operation in the single mode is performed.

BRIEF SUMMARY

The present disclosure provides a high-frequency front end circuit capable of operating in each of a carrier aggregation mode and a single mode and capable of suppressing insertion loss caused by a multiplexer when operating in a single mode, and a communication device including the high-frequency front end circuit.

A high-frequency front end circuit according to an embodiment of the present disclosure includes an antenna terminal, a multiplexer, a first power amplifier, a second power amplifier, and a switch circuit. The multiplexer is electrically connectable to the antenna terminal. The first power amplifier is electrically connectable to the multiplexer and amplifies a first transmission signal in a first frequency band. The second power amplifier is electrically connectable to the multiplexer and amplifies a second transmission signal in a second frequency band different from the first frequency band. The switch circuit switches between a first route passing through the multiplexer and a second route not passing through the multiplexer. In the high-frequency front end circuit, the first route is formed in a case of a carrier aggregation mode in which the first power amplifier and the second power amplifier are simultaneously used, and the second route is formed in a case of a single mode in which one of the first power amplifier and the second power amplifier is used.

A high-frequency front end circuit according to an embodiment of the present disclosure includes an antenna terminal, a multiplexer, a first low noise amplifier, a second low noise amplifier, and a switch circuit. The multiplexer is electrically connectable to the antenna terminal. The first low noise amplifier is electrically connectable to the multiplexer and amplifies a first reception signal in a first frequency band. The second low noise amplifier is electrically connectable to the multiplexer and amplifies a second reception signal in a second frequency band different from the first frequency band. The switch circuit switches between a first route passing through the multiplexer and a second route not passing through the multiplexer. In the high-frequency front end circuit, the first route is formed in a case of a carrier aggregation mode in which the first low noise amplifier and the second low noise amplifier are simultaneously used, and the second route is formed in a case of a single mode in which one of the first low noise amplifier and the second low noise amplifier is used.

A communication device according to an embodiment of the present disclosure includes the high-frequency front end circuit, and a control circuit which controls the switch circuit of the high-frequency front end circuit.

Other features, elements, characteristics and advantages of the present disclosure will become more apparent from the following detailed description of embodiments of the present disclosure with reference to the attached drawings.

DETAILED DESCRIPTION

First Embodiment

Hereinafter, a high-frequency front end circuit 1 and a communication device 100 including the high-frequency front end circuit according to a first embodiment will be described with reference to FIGS. 1 to 5.

1. Overall Configuration of High-Frequency Front End Circuit and Communication Device The high-frequency front end circuit 1 is arranged, for example, at a front-end portion of a cellular phone or the like supporting a multi-mode/multi-band and supporting carrier aggregation. The high-frequency front end circuit 1 can support uplink carrier aggregation in which a plurality of (two in the first embodiment) frequency bands is simultaneously used in the uplink. Additionally, the high-frequency front end circuit 1 can support downlink carrier aggregation in which a plurality of (two in the first embodiment) frequency bands is simultaneously used in downlink. The high-frequency front end circuit 1 is configured so as to be able to amplify a transmission signal input from a signal processing circuit 101 and output the amplified signal to an antenna. Additionally, the high-frequency front end circuit 1 is configured so as to be able to amplify a reception signal input from the antenna and output the amplified signal to the signal processing circuit 101.

Figure 1:
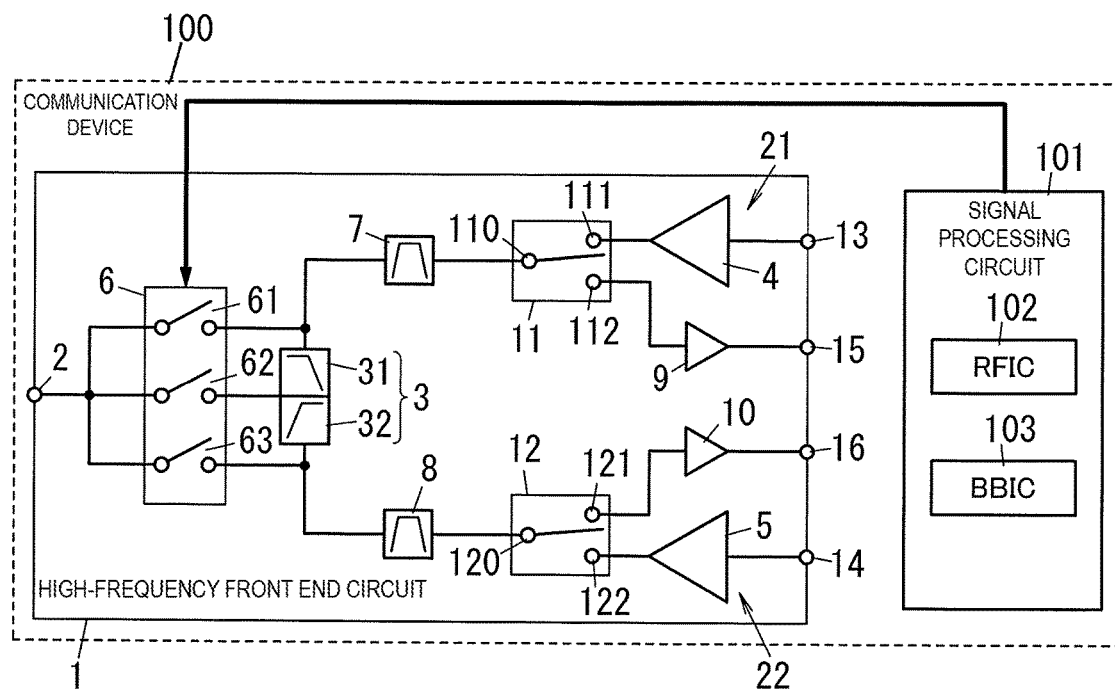
FIG. 1 is a circuit configuration diagram of a high-frequency front end circuit and a communication device including the high-frequency front end circuit according to a first embodiment of the present disclosure.

The high-frequency front end circuit 1 is a circuit capable of operating in each of a carrier aggregation mode and a single mode. The high-frequency front end circuit 1 includes an antenna terminal 2, a multiplexer 3, a first power amplifier 4, a second power amplifier 5, and a switch circuit 6. The antenna terminal 2 is electrically connected to the antenna. The multiplexer 3 is electrically connectable to the antenna terminal 2. The first power amplifier 4 is electrically connectable to the multiplexer 3. The first power amplifier 4 amplifies a transmission signal in a first frequency band (first transmission signal). The second power amplifier 5 is electrically connectable to the multiplexer 3. The second power amplifier 5 amplifies a transmission signal in a second frequency band (second transmission signal) different from the first frequency band. Here, the first frequency band and the second frequency band do not overlap with each other. The switch circuit 6 is provided between the antenna terminal 2 and the multiplexer 3. Here, "provided between the antenna terminal 2 and the multiplexer 3" means being provided between the antenna terminal 2 and the multiplexer 3 from the view point of an electric circuit as illustrated in FIG. 1. The switch circuit 6 switches between a first route r1 (see FIG. 2) passing through the multiplexer 3 and a second route r2 (see FIGS. 3 and 4). In the high-frequency front end circuit 1, the first route r1 is formed in a case of the carrier aggregation mode in which the first power amplifier 4 and the second power amplifier 5 are simultaneously used, and the second route r2 is formed in a case of the single mode in which one of the first power amplifier 4 and the second power amplifier 5 is used. The first route r1 includes a main route m1 (see FIG. 2). The main route m1 is a route for electrically connecting the antenna terminal 2 and the multiplexer 3. The second route r2 includes a first bypass route b1 (see FIG. 3) and a second bypass route b2 (see FIG. 4). The first bypass route b1 is a route for electrically connecting the antenna terminal 2 and the first power amplifier 4 without necessarily interposing the multiplexer 3. The second bypass route b2 is a route for electrically connecting the antenna terminal 2 and the second power amplifier 5 without necessarily interposing the multiplexer 3. The switch circuit 6 switches a signal route by alternatively switching among the main route m1, the first bypass route b1, and the second bypass route b2.

In addition, the high-frequency front end circuit 1 further includes a first low noise amplifier 9, a second low noise amplifier 10, a first filter 7, and a second filter 8. The first low noise amplifier 9 amplifies a reception signal in the first frequency band (first reception signal). The second low noise amplifier amplifies a reception signal in the second frequency band (second reception signal). The first filter 7 is provided between the antenna terminal 2 and the first power amplifier 4 and the first low noise amplifier 9. Here, "provided between the antenna terminal 2 and the first power amplifier 4 and the first low noise amplifier 9" means being provided between the antenna terminal 2 and the first power amplifier 4 and the first low noise amplifier 9 from the view point of an electric circuit as illustrated in FIG. 1. The first filter 7 allows a signal in a first pass band (the first transmission signal and the first reception signal) to pass therethrough. The second filter 8 is provided between the antenna terminal 2 and the second power amplifier 5 and the second low noise amplifier 10. Here, "provided between the antenna terminal 2 and the second power amplifier 5 and the second low noise amplifier 10" means being provided between the antenna terminal 2 and the second power amplifier 5 and the second low noise amplifier 10 from the view point of an electric circuit as illustrated in FIG. 1. The second filter 8 allows a signal in a second pass band different from the first pass band (the second transmission signal and the second reception signal) to pass therethrough.

Further, the high-frequency front end circuit 1 further includes a first switch 11 and a second switch 12. The first switch 11 switches a connection relationship between the first filter 7 and the first power amplifier 4 and the first low noise amplifier 9. The second switch 12 switches a connection relationship between the second filter 8 and the second power amplifier 5 and the second low noise amplifier 10.

The high-frequency front end circuit 1 includes a first transmission/reception circuit 21 including the first filter 7, the first switch 11, the first power amplifier 4, and the first low noise amplifier 9, and a second transmission/reception circuit 22 including the second filter 8, the second switch 12, the second power amplifier 5, and the second low noise amplifier 10.

The first transmission/reception circuit 21 transmits the first transmission signal in the first frequency band. The first transmission signal is, for example, a transmission signal for 5G (Fifth Generation) communication (fifth generation mobile communication system). Additionally, the first transmission/reception circuit 21 receives the first reception signal in the first frequency band. The first reception signal is, for example, a reception signal for the 5G communication.

The second transmission/reception circuit 22 transmits the second transmission signal in the second frequency band higher than the first frequency band. The second transmission signal is, for example, a transmission signal for the 5G communication. Additionally, the second transmission/reception circuit 22 receives the second reception signal in the second frequency band. The second reception signal is, for example, a reception signal for the 5G communication.

In addition, the high-frequency front end circuit 1 further includes a first input terminal 13, a second input terminal 14, a first output terminal 15, and a second output terminal 16. The first input terminal 13 and the second input terminal 14 are, for example, terminals electrically connected to the signal processing circuit 101 outside the high-frequency front end circuit 1 and for receiving a high-frequency signal (transmission signal) from the signal processing circuit 101. The first output terminal 15 and the second output terminal 16 are, for example, terminals electrically connected to the signal processing circuit 101 and for outputting the first reception signal and the second reception signal, respectively, to the signal processing circuit 101. The high-frequency front end circuit 1 is a high-frequency front end circuit supporting MIMO (Multi Input Multi Output). The signal processing circuit 101 is not a constituent element of the high-frequency front end circuit 1.

The communication device 100 includes the high-frequency front end circuit 1 and the signal processing circuit 101. In the communication device 100, the signal processing circuit 101 constitutes a control circuit for controlling the switch circuit 6 of the high-frequency front end circuit 1.

The signal processing circuit 101 includes, for example, an RF signal processing circuit 102 and a baseband signal processing circuit 103. The RF signal processing circuit 102 is, for example, an RFIC (Radio Frequency Integrated Circuit), and performs signal processing on a high-frequency signal. For example, the RF signal processing circuit 102 performs signal processing such as up-conversion on a high-frequency signal (transmission signal) output from the baseband signal processing circuit 103, and outputs the high-frequency signal on which the signal processing has been performed to the first input terminal 13. The baseband signal processing circuit 103 is, for example, a BBIC (Baseband Integrated Circuit), and performs predetermined signal processing on a transmission signal from the outside of the signal processing circuit 101.

2. Details of High-Frequency Front End Circuit

Next, each constituent element of the high-frequency front end circuit 1 will be described with reference to the drawings.

The first transmission/reception circuit 21 includes the first power amplifier 4, the first filter 7, the first low noise amplifier 9, and the first switch 11. Here, the first switch 11 is a switch for switching, in the first transmission/reception circuit 21, between a state in which the first power amplifier 4 is electrically connected to the first filter 7 and a state in which the first low noise amplifier 9 is electrically connected to the first filter 7. The first switch 11 has a common terminal 110 and two selection terminals 111 and 112.

The first power amplifier 4 amplifies the first transmission signal in the first frequency band which is input thereto, and outputs the amplified first transmission signal. More specifically, the first power amplifier 4 amplifies the first transmission signal in the first frequency band, which is input to an input end from the signal processing circuit 101 through the first input terminal 13, for example, and outputs the amplified first transmission signal from an output end. In other words, the first power amplifier 4 is a power amplifier which can amplify a high-frequency signal in the first frequency band (first transmission signal). The first frequency band includes, for example, an n77/an n78 of an NR band (NR operating band) of the 5G standard. An uplink frequency band (Uplink frequency range) and a downlink frequency band (Downlink frequency range) of the n77 are each approximately 3300 MHz-4200 MHz. An uplink frequency band and a downlink frequency band of the n78 are each approximately 3300 MHz-3800 MHz. When the n77/78 is used, a method for achieving simultaneous transmission and reception of the first transmission signal and the first reception signal (Duplex Mode) is TDD (Time Division Duplex). In addition, the first frequency band includes a band 42 (B42)/a band 43 (B43) of the 3GPP LTE (Long Term Evolution) standard. The downlink frequency band of the band 42 is approximately 3400 MHz-3600 MHz. The downlink frequency band of the band 43 is approximately 3600 MHz-3800 MHz.

The input end of the first power amplifier 4 is electrically connected to the first input terminal 13. Additionally, the output end of the first power amplifier 4 is electrically connected to one selection terminal 111 of the two selection terminals 111 and 112 of the first switch 11. With this, the output end of the first power amplifier 4 can be electrically connected to the antenna terminal 2 with the first switch 11, the first filter 7, the multiplexer 3, the switch circuit 6, and the like interposed therebetween.

The first low noise amplifier 9 amplifies the first reception signal in the first frequency band which is input thereto, and outputs the amplified first reception signal. More specifically, the first low noise amplifier 9 amplifies the first reception signal in the first frequency band, which is input to an input end through the antenna terminal 2, the first filter 7, and the first switch 11, for example, and outputs the amplified first reception signal from an output end. In other words, the first low noise amplifier 9 is a low noise amplifier which can amplify a high-frequency signal in the first frequency band (first reception signal).

The input end of the first low noise amplifier 9 is electrically connected to one selection terminal 112 of the two selection terminals 111 and 112 of the first switch 11. With this, the input end of the first low noise amplifier 9 can be electrically connected to the antenna terminal 2 with the first switch 11, the first filter 7, the multiplexer 3, the switch circuit 6, and the like interposed therebetween. Additionally, the output end of the first low noise amplifier 9 is electrically connected to the first output terminal 15.

The first filter 7 is provided between the antenna terminal 2 and the first power amplifier 4 and the first low noise amplifier 9. Here, "provided between the antenna terminal 2 and the first power amplifier 4 and the first low noise amplifier 9" means being provided between the antenna terminal 2 and the first power amplifier 4 and the first low noise amplifier 9 from the view point of an electric circuit as illustrated in FIG. 1. The first filter 7 is a band pass filter that allows a signal in the first pass band (the first transmission signal and the first reception signal) to pass therethrough. More specifically, the first filter 7 is a band pass filter which is provided between the multiplexer 3 and the first power amplifier 4 and the first low noise amplifier 9 and which takes the first frequency band as the pass band. The first filter 7 allows a signal in the pass band of the first filter 7 (the first transmission signal and the first reception signal) to pass therethrough and attenuates a signal other than that in the pass band. The first filter 7 is, for example, a SAW (Surface Acoustic Wave) filter.

The first filter 7 has two input/output ends. In the first transmission/reception circuit 21, one input/output end of the first filter 7 is electrically connected to the common terminal 110 of the first switch 11, and the other input/output end of the first filter 7 is electrically connected to the multiplexer 3 and the switch circuit 6.

The first switch 11 switches between a state in which the first filter 7 and the first power amplifier 4 are electrically connected to each other and a state in which the first filter 7 and the first low noise amplifier 9 are electrically connected to each other. The first switch 11 is constituted by, for example, an SPDT (Single Pole Double Throw) type switch. The first switch 11 is controlled by, for example, the signal processing circuit 101. The first switch 11 electrically connects the common terminal 110 and any one of the two selection terminals 111 and 112 in accordance with a control signal from the RF signal processing circuit 102 of the signal processing circuit 101. The first switch 11 may be constituted by a switch IC.

The second transmission/reception circuit 22 includes the second power amplifier 5, the second filter 8, the second low noise amplifier 10, and the second switch 12. Here, the second switch 12 is a switch for switching, in the second transmission/reception circuit 22, between a state in which the second power amplifier 5 is electrically connected to the second filter 8 and a state in which the second low noise amplifier 10 is electrically connected to the second filter 8. The second switch 12 has a common terminal 120 and two selection terminals 121 and 122.

The second power amplifier 5 amplifies the second transmission signal in the second frequency band which is input thereto, and outputs the amplified second transmission signal. More specifically, the second power amplifier 5 amplifies the second transmission signal in the second frequency band, which is input to an input end from the signal processing circuit 101 through the second input terminal 14, for example, and outputs the amplified second transmission signal from an output end. In other words, the second power amplifier 5 is a power amplifier which can amplify a high-frequency signal in the second frequency band (second transmission signal). The second frequency band is on a higher-frequency side than the first frequency band. The second frequency band includes, for example, an n79 of the NR band of the 5G standard. An uplink frequency band and a downlink frequency band of the n79 are each approximately 4400 MHz-5000 MHz.

The input end of the second power amplifier 5 is electrically connected to the second input terminal 14. Additionally, the output end of the second power amplifier 5 is electrically connected to one selection terminal 121 of the two selection terminals 121 and 122 of the second switch 12. With this, the output end of the second power amplifier 5 can be electrically connected to the antenna terminal 2 with the second switch 12, the second filter 8, the multiplexer 3, the switch circuit 6, and the like interposed therebetween.

The second low noise amplifier 10 amplifies the second reception signal in the second frequency band which is input thereto, and outputs the amplified second reception signal. More specifically, the second low noise amplifier 10 amplifies the second reception signal in the second frequency band, which is input to an input end through the antenna terminal 2, the second filter 8, and the second switch 12, for example, and outputs the amplified second reception signal from an output end. In other words, the second low noise amplifier 10 is a low noise amplifier which can amplify a high-frequency signal in the second frequency band (second reception signal).

The input end of the second low noise amplifier 10 is electrically connected to one selection terminal 122 of the two selection terminals 121 and 122 of the second switch 12. With this, the input end of the second low noise amplifier 10 can be electrically connected to the antenna terminal 2 with the second switch 12, the second filter 8, the multiplexer 3, the switch circuit 6, and the like interposed therebetween. Additionally, the output end of the second low noise amplifier 10 is electrically connected to the second output terminal 16.

The second filter 8 is provided between the antenna terminal 2 and the second power amplifier 5. Here, "provided between the antenna terminal 2 and the second power amplifier 5" means being provided between the antenna terminal 2 and the second power amplifier 5 from the view point of an electric circuit as illustrated in FIG. 1. The second filter 8 is a band pass filter that allows a signal in the second pass band (the second transmission signal and the second reception signal) to pass therethrough. More specifically, the second filter 8 is a band pass filter which is provided between the multiplexer 3 and the second power amplifier 5 and which takes the second frequency band as the pass band. The second pass band is different from the first pass band. The second pass band does not overlap with the first pass band.

The second filter 8 has two input/output ends. In the second transmission/reception circuit 22, one input/output end of the second filter 8 is electrically connected to the common terminal 120 of the second switch 12, and the other input/output end of the second filter 8 is electrically connected to the multiplexer 3 and the switch circuit 6. The second filter 8 allows a signal in the pass band of the second filter 8 (the second transmission signal and the second reception signal) to pass therethrough and attenuates a signal other than that in the pass band. The second filter 8 is, for example, the SAW filter.

The second switch 12 switches between a state in which the second filter 8 and the second power amplifier 5 are electrically connected to each other and a state in which the second filter 8 and the second low noise amplifier 10 are electrically connected to each other. The second switch 12 is constituted by, for example, the SPDT type switch. The second switch 12 is controlled by, for example, the signal processing circuit 101. The second switch 12 electrically connects the common terminal 120 and any one of the two selection terminals 121 and 122 in accordance with the control signal from the RF signal processing circuit 102 of the signal processing circuit 101. The second switch 12 may be constituted by the switch IC.

The multiplexer 3 is a demultiplexing/multiplexing circuit having a function of demultiplexing the reception signal input to the antenna terminal 2 for each frequency band and a function of multiplexing a plurality of transmission signals. In the high-frequency front end circuit 1 according to the first embodiment, the multiplexer 3 is a diplexer and includes a low pass filter 31 and a high pass filter 32. The low pass filter 31 has a filter characteristic of allowing a signal in the first frequency band (the first transmission signal and the first reception signal) to pass therethrough and attenuating a signal in the second frequency band (the second transmission signal and the second reception signal). The high pass filter 32 has a filter characteristic of allowing a signal in the second frequency band (the second transmission signal and the second reception signal) to pass therethrough and attenuating a signal in the first frequency band (the first transmission signal and the first reception signal).

Figure 5:
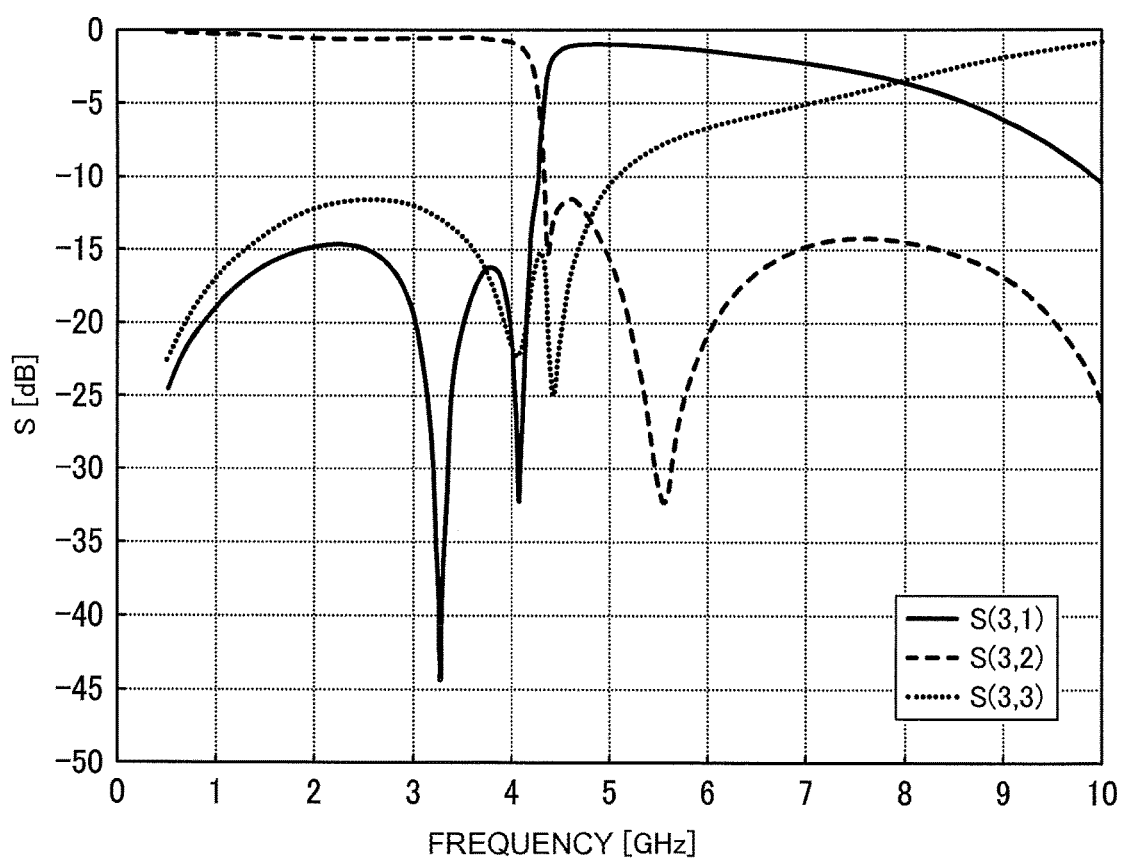
FIG. 5 is a frequency characteristic diagram of a multiplexer in the above-described high-frequency front end circuit.
Figure 6:
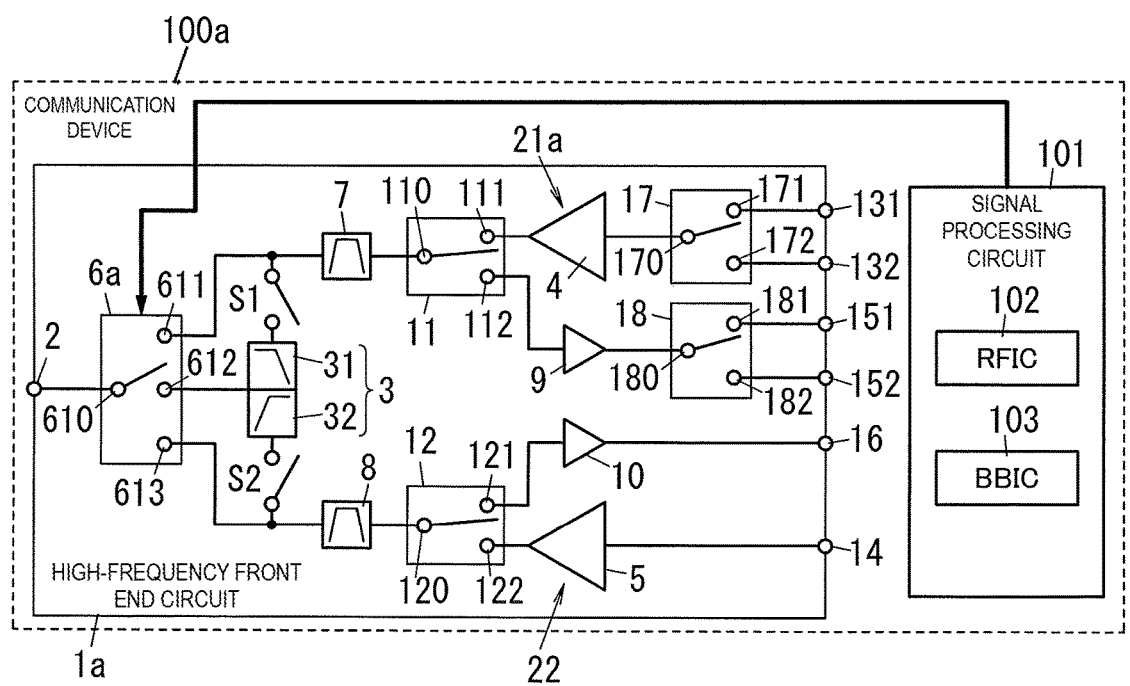
FIG. 6 is a circuit configuration diagram of a high-frequency front end circuit and a communication device including the high-frequency front end circuit according to a second embodiment of the present disclosure.

Each of the low pass filter 31 and the high pass filter 32 has a plurality of elastic wave resonators. Each of the elastic wave resonators includes a piezoelectric body layer, an interdigital transducer (IDT) electrode, and a high acoustic velocity member. The IDT electrode is formed on the piezoelectric body layer and has a plurality of electrode fingers. The high acoustic velocity member is located on the side opposite to the IDT electrode with the piezoelectric body layer sandwiched therebetween. The acoustic velocity of a bulk wave propagating in the high acoustic velocity member is higher than the acoustic velocity of an elastic wave propagating in the piezoelectric body layer. The thickness of the piezoelectric body layer is equal to or smaller than approximately $3.5\lambda$ when a wave length of the elastic wave determined by an electrode finger period of the IDT electrode is taken as $\lambda$. In the multiplexer 3, insertion loss of the signal in the first frequency band is, for example, approximately 2.2 dB. FIG. 5 is a frequency characteristic diagram of an example of the multiplexer 3. In FIG. 5, a horizontal axis represents a frequency. In FIG. 5, a vertical axis represents an S (Scattering) parameter. In FIG. 5, S(3, 2) indicated by a broken line shows frequency characteristics of the low pass filter 31. In FIG. 5, S(3, 1) indicated by a solid line shows frequency characteristics of the high pass filter 32.

The switch circuit 6 is an RF (Radio Frequency) switch used for switching a signal route of a high-frequency signal, and includes three switches 61, 62, and 63. The RF switch constituting the switch circuit 6 is, for example, a switch IC. Here, each of the three switches 61, 62, and 63 is, for example, a semiconductor switch. Each of the semiconductor switches is, for example, an FET (Field Effect Transistor). Insertion loss of each of the switches 61, 62, and 63 is smaller than the insertion loss of the multiplexer 3. The insertion loss of each of the switches 61, 62, and 63 is approximately of 0.2 dB, as an example.

Figure 3:
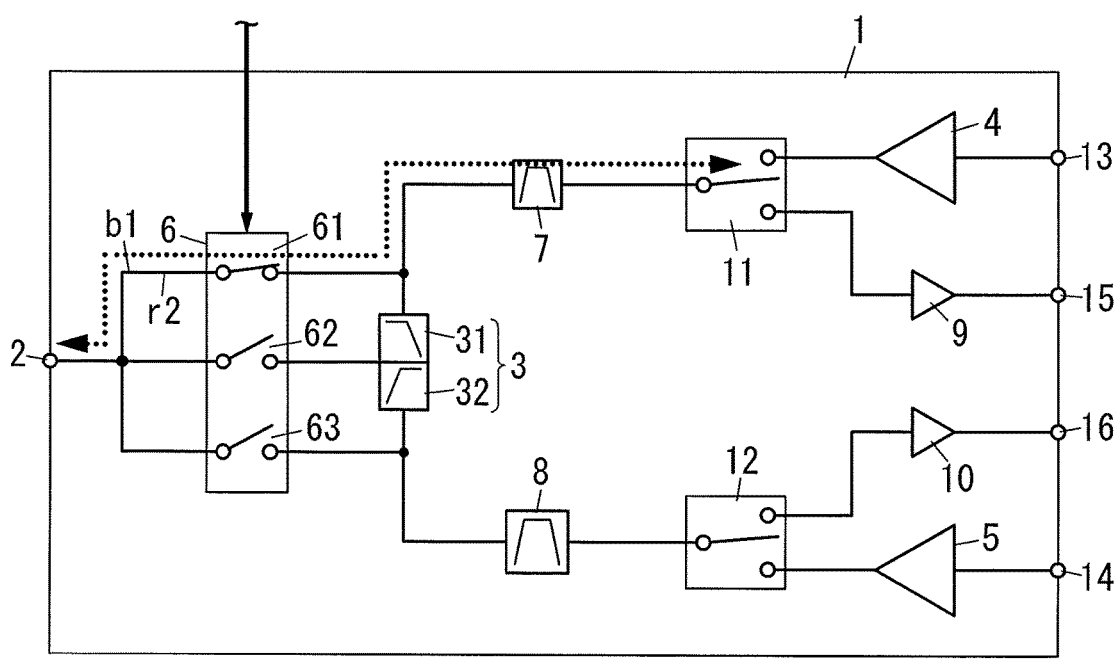
FIG. 3 is an explanatory diagram of an operation of the above-described high-frequency front end circuit.

The switch 61 of the switch circuit 6 is provided between the antenna terminal 2 and the first filter 7 without necessarily interposing the multiplexer 3. Here, "provided between the antenna terminal 2 and the first filter 7" means being provided between the antenna terminal 2 and the first filter 7 from the view point of an electric circuit as illustrated in FIG. 1. Accordingly, in the high-frequency front end circuit 1, when the switch 61 is turned on as illustrated in FIG. 3, a route (signal route) of the first input terminal 13—the first power amplifier 4—the first switch 11—the first filter 7—the switch 61 of the switch circuit 6—the antenna terminal 2, and a route (signal route) of the antenna terminal 2—the switch 61 of the switch circuit 6—the first filter 7—the first switch 11—the first low noise amplifier 9—the first output terminal 15 can be alternatively formed. In other words, in the high-frequency front end circuit 1, when the switch 61 is turned on, the second route r2 including the first bypass route b1 can be formed.

Figure 2:
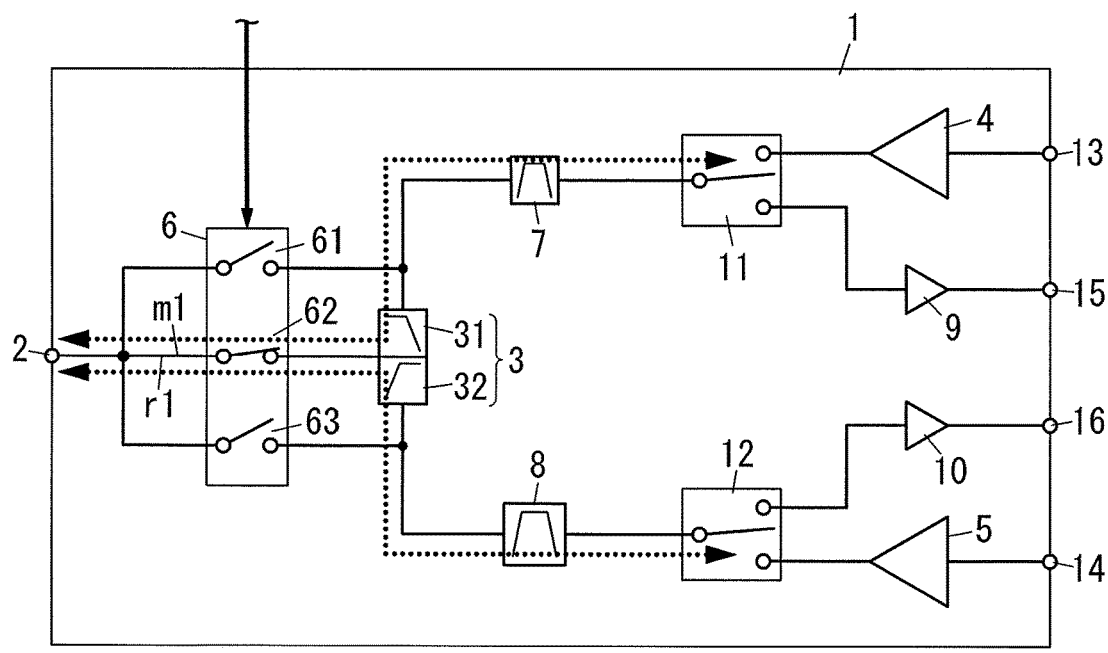
FIG. 2 is an explanatory diagram of an operation of the above-described high-frequency front end circuit.

The switch 62 of the switch circuit 6 is provided between the antenna terminal 2 and the multiplexer 3. Accordingly, in the high-frequency front end circuit 1, when the switch 62 is turned on as illustrated in FIG. 2, a route (signal route) of the first input terminal 13—the first power amplifier 4—the first switch 11—the first filter 7—(the low pass filter 31 of) the multiplexer 3—the switch 62 of the switch circuit 6—the antenna terminal 2, and a route (signal route) of the second input terminal 14—the second power amplifier 5—the second switch 12—the second filter 8—(the high pass filter 32 of) the multiplexer 3—the switch 62 of the switch circuit 6—the antenna terminal 2 can be simultaneously formed. In other words, the high-frequency front end circuit 1 can support the carrier aggregation of two uplinks. In addition, in the high-frequency front end circuit 1, when the switch 62 is turned on, a route (signal route) of the antenna terminal 2—the switch 62—(the low pass filter 31 of) the multiplexer 3, the first switch 11—the first low noise amplifier—the first output terminal 15, and a route (signal route) of the antenna terminal 2—the switch 62—(the high pass filter 32 of) the multiplexer 3—the second switch 12—the second low noise amplifier 10—the second output terminal 16 can be simultaneously formed. In other words, the high-frequency front end circuit 1 can support the carrier aggregation of two downlinks. In the high-frequency front end circuit 1, when the switch 62 is turned on, the first route r1 including the main route m1 can be formed.

Figure 4:
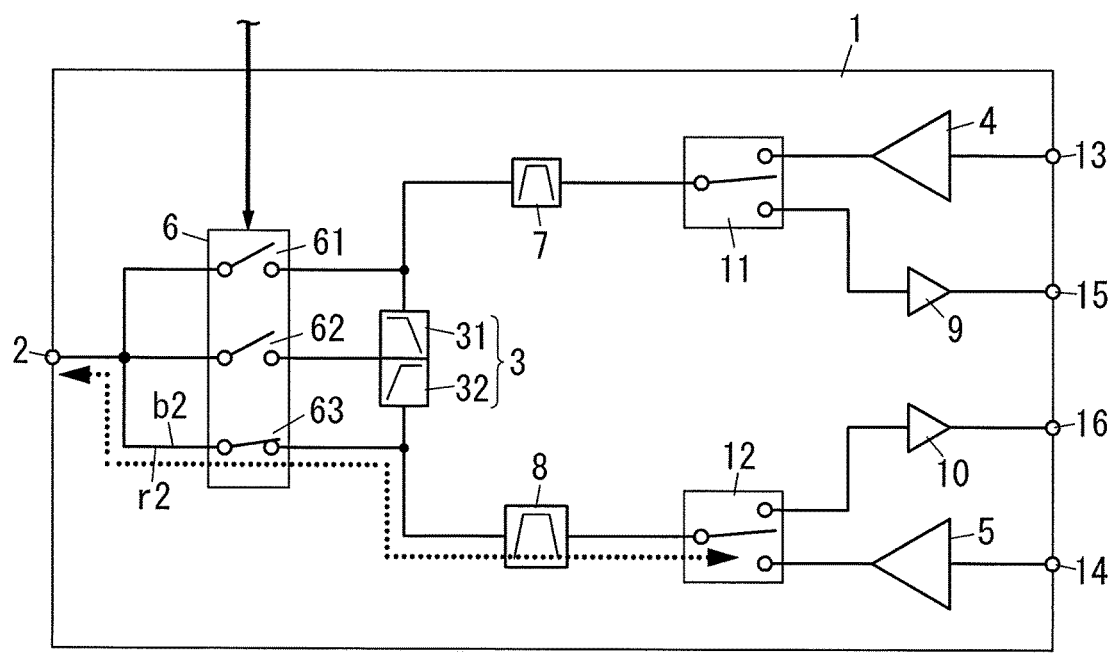
FIG. 4 is an explanatory diagram of an operation of the above-described high-frequency front end circuit.

The switch 63 of the switch circuit 6 is provided between the antenna terminal 2 and the second filter 8 without necessarily interposing the multiplexer 3. Here, "provided between the antenna terminal 2 and the second filter 8" means being provided between the antenna terminal 2 and the second filter 8 from the view point of an electric circuit as illustrated in FIG. 1. Accordingly, in the high-frequency front end circuit 1, when the switch 63 is turned on as illustrated in FIG. 4, a route (signal route) of the second input terminal 14—the second power amplifier 5—the second switch 12—the second filter 8—the switch 63 of the switch circuit 6—the antenna terminal 2, and a route (signal route) of the antenna terminal 2—the switch 63 of the switch circuit 6—the second filter 8—the second switch 12—the second low noise amplifier 10—the second output terminal 16 can be alternatively formed. In other words, in the high-frequency front end circuit 1, when the switch 63 is turned on, the second route r2 including the second bypass route b2 can be formed.

The switch circuit 6 is controlled by (the RF signal processing circuit 102 of) the signal processing circuit 101. The switch circuit 6 is controlled by the signal processing circuit 101 such that the three switches 61, 62, and 63 are alternatively turned on.

3. Operation of High-Frequency Front End Circuit

Next, operations of the high-frequency front end circuit 1 will be described with reference to FIGS. 2 to 4.

The operations of the high-frequency front end circuit 1 includes an operation of the carrier aggregation mode and an operation of the single mode. The operations of the high-frequency front end circuit 1 is controlled by a control signal from the signal processing circuit 101.

3.1. Operation in Carrier Aggregation Mode

In the high-frequency front end circuit 1, when the operation in the carrier aggregation mode is performed, as illustrated in FIG. 2, the switch 61 is turned off, the switch 62 is turned on, and the switch 63 is turned off of the switch circuit 6.

In the first transmission/reception circuit 21, the high-frequency front end circuit 1 can achieve, in a pseudo manner, simultaneous transmission/reception of the first transmission signal and the first reception signal by the TDD. Here, "achieve in a pseudo manner" means that the transmission of the first transmission signal and the reception of the first reception signal are not simultaneously performed but are performed in a short period of time which can be regarded as being simultaneous. In the high-frequency front end circuit 1, by switching between a state in which the selection terminal 111 is connected to the common terminal 110 and a state in which the selection terminal 112 is connected to the common terminal 110, of the first switch 11, in a short period of time, the simultaneous transmission/reception of the first transmission signal and the first reception signal is achieved in a pseudo manner. In the same manner, in the second transmission/reception circuit 22, the high-frequency front end circuit 1 can achieve simultaneous transmission/reception of the second transmission signal and the second reception signal in a pseudo manner by the TDD.

In the high-frequency front end circuit 1, in a case of a state where the selection terminal 111 is electrically connected to the common terminal 110 of the first switch 11, the first transmission signal input to the first input terminal 13 is amplified by the first power amplifier 4 and is output to the antenna through the first switch 11, the first filter 7, the multiplexer 3, the switch 62 of the switch circuit 6, and the antenna terminal 2.

In addition, in the high-frequency front end circuit 1, in a case of a state where the selection terminal 112 is electrically connected to the common terminal 110 of the first switch 11, the first reception signal input to the antenna terminal 2 is input to the first low noise amplifier 9 through the low pass filter 31 of the multiplexer 3, the first filter 7, and the first switch 11, and the amplified first reception signal is output from the first output terminal 15 to the signal processing circuit 101.

In addition, in the high-frequency front end circuit 1, in a case of a state where the selection terminal 121 is electrically connected to the common terminal 120 of the second switch 12, the second transmission signal input to the second input terminal 14 is amplified by the second power amplifier 5 and is output to the antenna through the second switch 12, the second filter 8, the multiplexer 3, the switch 62 of the switch circuit 6, and the antenna terminal 2.

In addition, in the high-frequency front end circuit 1, in a case of a state where the selection terminal 122 is electrically connected to the common terminal 120 of the second switch 12, the second reception signal input to the antenna terminal 2 is input to the second low noise amplifier 10 through the switch 62 of the switch circuit 6, the second filter 8, and the second switch 12, and the amplified second reception signal is output from the second output terminal 16 to the signal processing circuit 101.

3.2. Operation in Single Mode

In the high-frequency front end circuit 1, when the single mode operation is performed, the switch 61 is turned on, the switch 62 is turned off, and the switch 63 is turned off of the switch circuit 6 as illustrated in FIG. 3, or the switch 61 is turned off, the switch 62 is turned off, and the switch 63 is turned on of the switch circuit 6 as illustrated in FIG. 4.

As illustrated in FIG. 3, when the switch 61 of the switch circuit 6 is turned on, in the high-frequency front end circuit 1, in a case of a state where the selection terminal 111 is electrically connected to the common terminal 110 of the first switch 11, the first transmission signal input to the first input terminal 13 is amplified by the first power amplifier 4, and the amplified first transmission signal is output to the antenna through the first switch 11, the first filter 7, the switch 61 of the switch circuit 6, and the antenna terminal 2.

In addition, in the high-frequency front end circuit 1, in a case of a state where the selection terminal 112 is electrically connected to the common terminal 110 of the first switch 11, the first reception signal input to the antenna terminal 2 is input to the first low noise amplifier 9 through the first filter 7 and the first switch 11, and the amplified first reception signal is output from the first output terminal 15 to the signal processing circuit 101.

As illustrated in FIG. 4, when the switch 63 of the switch circuit 6 is turned on, in the high-frequency front end circuit 1, in a case of a state where the selection terminal 121 is electrically connected to the common terminal 120 of the second switch 12, the second transmission signal input to the second input terminal 14 is amplified by the second power amplifier 5, and the amplified second transmission signal is output to the antenna through the second switch 12, the second filter 8, the switch 63 of the switch circuit 6, and the antenna terminal 2.

In addition, in the high-frequency front end circuit 1, in a case of a state where the selection terminal 122 is electrically connected to the common terminal 120 of the second switch 12, the second reception signal input to the antenna terminal 2 is input to the second low noise amplifier 10 through the second filter 8 and the second switch 12, and the amplified second reception signal is output from the second output terminal 16 to the signal processing circuit 101.

4. Effects

The high-frequency front end circuit 1 according to the first embodiment includes the antenna terminal 2, the multiplexer 3, the first power amplifier 4, the second power amplifier 5, and the switch circuit 6. The multiplexer 3 is electrically connectable to the antenna terminal 2. The first power amplifier 4 is electrically connectable to the multiplexer 3 and amplifies the first transmission signal in the first frequency band. The second power amplifier 5 is electrically connectable to the multiplexer 3 and amplifies the second transmission signal in the second frequency band different from the first frequency band. The switch circuit 6 switches between the first route r1 passing through the multiplexer 3 and the second route r2 not passing through the multiplexer 3. In the high-frequency front end circuit 1, the first route r1 is formed in a case of the carrier aggregation mode in which the first power amplifier 4 and the second power amplifier 5 are simultaneously used, and the second route r2 is formed in a case of the single mode in which one of the first power amplifier 4 and the second power amplifier 5 is used.

The high-frequency front end circuit 1 according to the first embodiment is capable of operating in each of the carrier aggregation mode and the single mode and capable of suppressing the insertion loss caused by the multiplexer 3 when operating in the single mode. Here, in the high-frequency front end circuit 1 according to the first embodiment, when operating in the single mode, the first transmission signal or the second signal does not pass through the multiplexer 3 and passes through the switch 61 or 63 having a smaller insertion loss than that of the multiplexer 3. Accordingly, in the high-frequency front end circuit 1 according to the first embodiment, the insertion loss of the signal route of each of the first transmission signal and the second transmission signal can be reduced as compared with a comparative example configured such that each of the first transmission signal and the second transmission signal passes through the multiplexer when operating in the single mode. In other words, in the high-frequency front end circuit 1 according to the first embodiment, when operating in the single mode, transmission characteristics do not deteriorate by the insertion loss of the multiplexer 3.

Additionally, the high-frequency front end circuit 1 according to the first embodiment includes the antenna terminal 2, the multiplexer 3, the first low noise amplifier 9, the second low noise amplifier 10, and the switch circuit 6. The multiplexer 3 is electrically connectable to the antenna terminal 2. The first low noise amplifier 9 is electrically connectable to the multiplexer 3 and amplifies the first reception signal in the first frequency band. The second low noise amplifier 10 is electrically connectable to the multiplexer 3 and amplifies the second reception signal in the second frequency band different from the first frequency band. The switch circuit 6 switches between the first route r1 passing through the multiplexer 3 and the second route r2 not passing through the multiplexer 3. In the high-frequency front end circuit 1, the first route r1 is formed in a case of the carrier aggregation mode in which the first low noise amplifier 9 and the second low noise amplifier 10 are simultaneously used, and the second route r2 is formed in a case of the single mode in which one of the first low noise amplifier 9 and the second low noise amplifier 10 is used.

With this configuration, the high-frequency front end circuit 1 according to the first embodiment is capable of operating in each of the carrier aggregation mode and the single mode and capable of suppressing the insertion loss caused by the multiplexer 3 when operating in the single mode. Here, in the high-frequency front end circuit 1 according to the first embodiment, when operating in the single mode, the first reception signal or the second reception signal does not pass through the multiplexer 3 and passes through the switch 61 or 63 having a smaller insertion loss than that of the multiplexer 3. Accordingly, in the high-frequency front end circuit 1 according to the first embodiment, the insertion loss of the signal route of each of the first reception signal and the second reception signal can be reduced as compared with the comparative example configured such that each of the first reception signal and the second reception signal pass through the multiplexer when operating in the single mode. In other words, in the high-frequency front end circuit 1 according to the first embodiment, when operating in the single mode, reception characteristics do not deteriorate by the insertion loss of the multiplexer 3.

5. Communication Device

The communication device 100 includes the high-frequency front end circuit 1 and the signal processing circuit 101. The signal processing circuit 101 includes the RF signal processing circuit 102 and the baseband signal processing circuit 103. The RF signal processing circuit processes a high-frequency signal received through the antenna that is electrically connected to the antenna terminal 2 of the high-frequency front end circuit 1. The high-frequency front end circuit 1 transmits a high-frequency signal (a reception signal and a transmission signal) between the antenna and the RF signal processing circuit 102 of the signal processing circuit 101. In the communication device 100, the baseband signal processing circuit 103 is not a required constituent element.

The RF signal processing circuit 102 is, for example, the RFIC, and performs signal processing on a high-frequency signal (reception signal). For example, the RF signal processing circuit 102 performs signal processing such as down-conversion on the high-frequency signal (reception signal) input from the antenna through the high-frequency front end circuit 1, and outputs the reception signal generated by the signal processing to the baseband signal processing circuit 103. The baseband signal processing circuit 103 is, for example, the BBIC. The reception signal processed by the baseband signal processing circuit 103 is used, for example, for image display as an image signal or for a call as an audio signal.

Additionally, the RF signal processing circuit 102 performs signal processing such as up-conversion on a high-frequency signal (transmission signal) output from the baseband signal processing circuit 103, for example, and outputs the high-frequency signal on which the signal processing has been performed to the high-frequency front end circuit 1. The baseband signal processing circuit 103 performs, for example, predetermined signal processing on a transmission signal from the outside of the communication device 100.

Second Embodiment

Hereinafter, a high-frequency front end circuit 1a and a communication device 100a including the high-frequency front end circuit according to a second embodiment will be described with reference to FIGS. 6 to 9. Constituent elements of the high-frequency front end circuit 1a and the communication device 100a according to the second embodiment which are the same as those of the high-frequency front end circuit 1 and the communication device 100 according to the first embodiment are given the same reference numerals, and the description thereof will be omitted.

The high-frequency front end circuit 1a according to the second embodiment is different from the high-frequency front end circuit 1 according to the first embodiment in a point that a switch circuit 6a is included instead of the switch circuit 6 of the high-frequency front end circuit 1 according to the first embodiment.

Additionally, the high-frequency front end circuit 1a according to the second embodiment is different from the high-frequency front end circuit 1 according to the first embodiment in a point that a first insulation switch S1 and a second insulation switch S2 are included.

Additionally, the high-frequency front end circuit 1a according to the second embodiment is different from the high-frequency front end circuit 1 according to the first embodiment in a point that two first input terminals 131 and 132 and two first output terminals 151 and 152 are included instead of the first input terminal 13 and the first output terminal 15 of the high-frequency front end circuit 1 according to the first embodiment.

Additionally, the high-frequency front end circuit 1a according to the second embodiment includes a first transmission/reception circuit 21a instead of the first transmission/reception circuit 21 of the high-frequency front end circuit 1 according to the first embodiment. The first transmission/reception circuit 21a is different from the first transmission/reception circuit 21 of the high-frequency front end circuit 1 according to the first embodiment in a point that a switch 17 and a switch 18 are further included.

The switch 17 is the SPDT type switch and includes a common terminal 170 and two selection terminals 171 and 172. The common terminal 170 is electrically connected to the input end of the first power amplifier 4. In the switch 17, one selection terminal 171 of the two selection terminals 171 and 172 is electrically connected to one first input terminal 131 of the two first input terminals 131 and 132, and the other selection terminal 172 is electrically connected to the other first input terminal 132.

The switch 18 is the SPDT type switch and includes a common terminal 180 and two selection terminals 181 and 182. The common terminal 180 is electrically connected to the output end of the first low noise amplifier 9. In the switch 18, one selection terminal 181 of the two selection terminals 181 and 182 is electrically connected to one first output terminal 151 of the two first output terminals 151 and 152, and the other selection terminal 182 is electrically connected to the other first output terminal 152.

To the first input terminal 131, for example, the first transmission signal in the n77/n78 of the NR band of the 5G standard is input from the RF signal processing circuit 102. To the first input terminal 132, for example, the first transmission signal in the band 42/the band 43/a band 48 of the LTE standard is input from the RF signal processing circuit 102. From the first output terminal 151, for example, the first reception signal in the n77/n78 of the NR band of the 5G standard is output to the RF signal processing circuit 102. From the first output terminal 152, for example, the first reception signal in the band 42/band 43/band 48 of the LTE standard is output to the RF signal processing circuit 102.

The switch circuit 6a is an SP3T type switch and includes a common terminal 610 and three selection terminals 611, 612, and 613.

Figure 7:
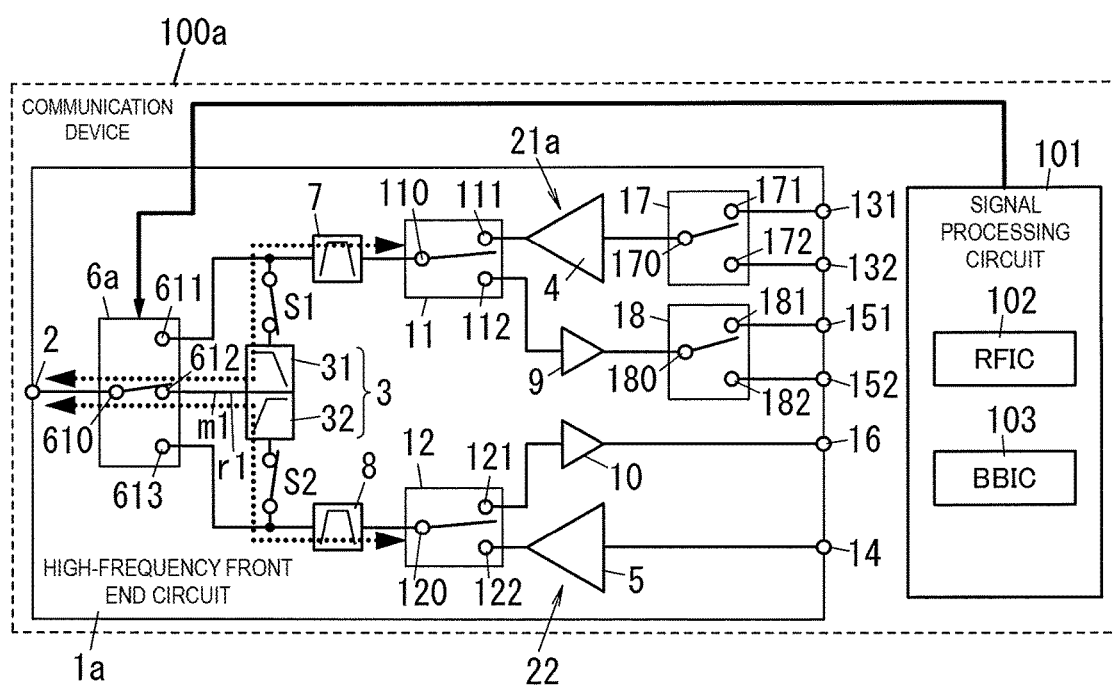
FIG. 7 is an explanatory diagram of an operation of the above-described high-frequency front end circuit.

In the high-frequency front end circuit 1a, when the operation in the carrier aggregation mode is performed, the common terminal 610 of the switch circuit 6a is electrically connected to the selection terminal 612 among the three selection terminals 611, 612, and 613 (see FIG. 7).

Figure 8:
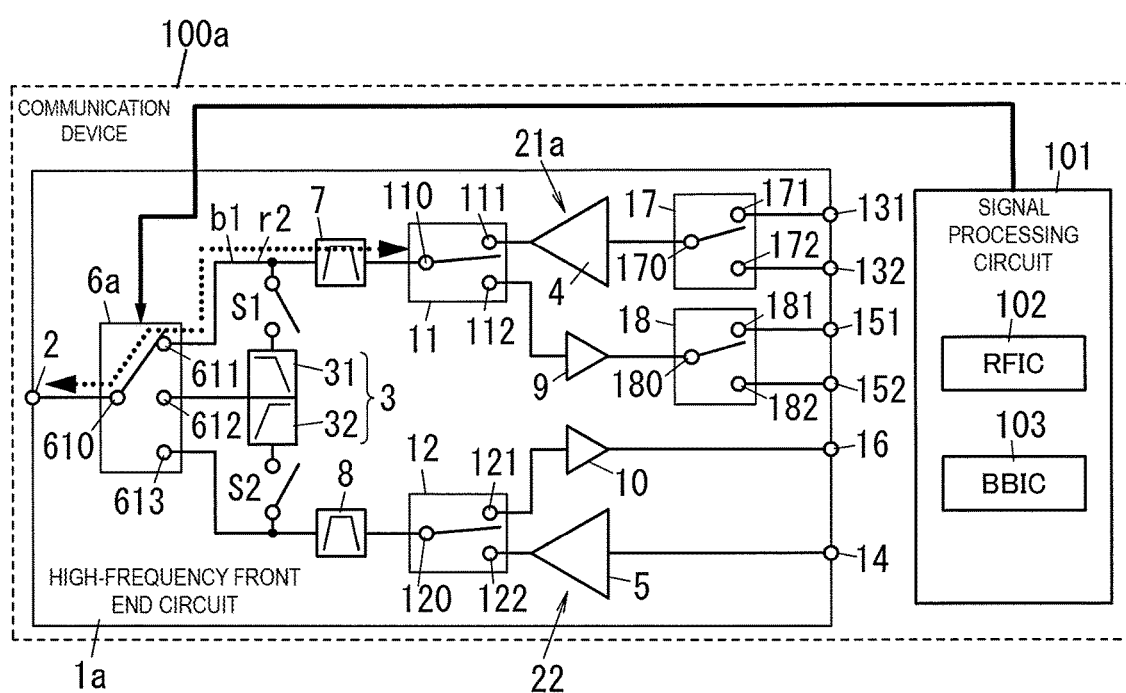
FIG. 8 is an explanatory diagram of an operation of the above-described high-frequency front end circuit.
Figure 9:
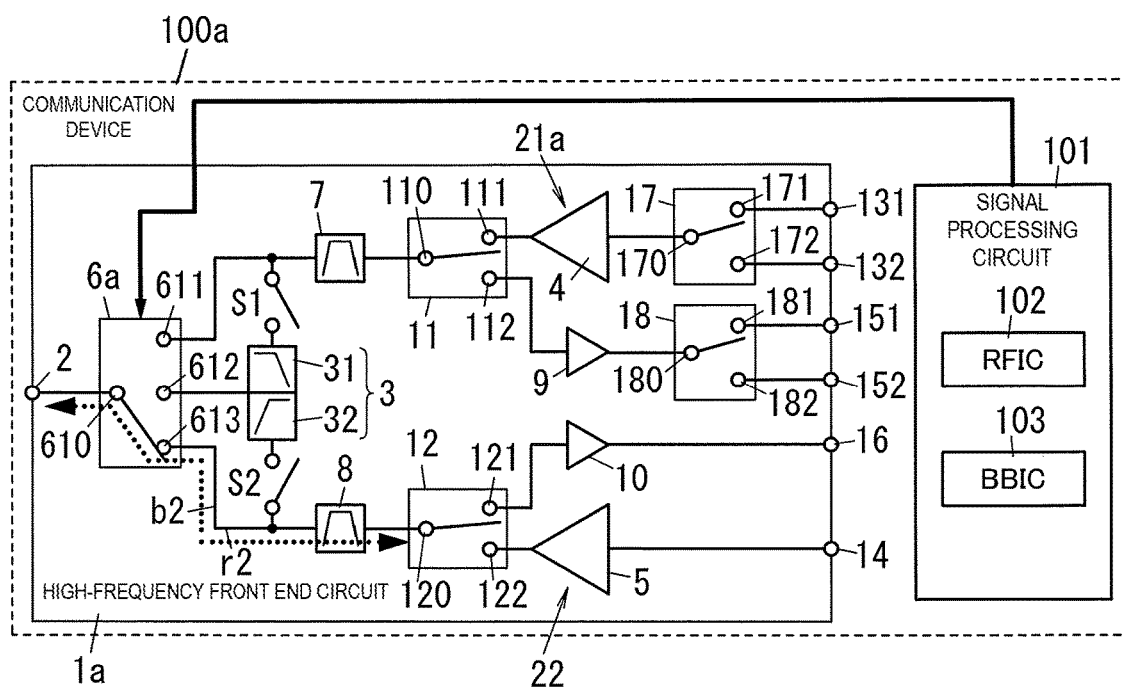
FIG. 9 is an explanatory diagram of an operation of the above-described high-frequency front end circuit.

In the high-frequency front end circuit 1a, when the operation in the single mode is performed, the common terminal 610 of the switch circuit 6a is electrically connected to the selection terminal 611 or 613 among the three selection terminals 611, 612, and 613 (see FIG. 8 or 9).

The first insulation switch S1 is provided between the first filter 7 and the multiplexer 3. The first insulation switch S1 is, for example, an SPST type switch.

The second insulation switch S2 is provided between the second filter 8 and the multiplexer 3. The second insulation switch S2 is, for example, the SPST type switch.

In the high-frequency front end circuit 1a, the first route r1 is formed in a case of the carrier aggregation mode in which the first power amplifier 4 and the second power amplifier 5 are simultaneously used, or in a case of the carrier aggregation in which the first low noise amplifier 9 and the second low noise amplifier 10 are simultaneously used, by both the first insulation switch S1 and the second insulation switch S2 being switched on (see FIG. 7). In the high-frequency front end circuit 1a, when the operation in the carrier aggregation mode in which the first power amplifier 4 and the second power amplifier 5 are simultaneously used is performed, the common terminal 110 of the first switch 11 is electrically connected to the one selection terminal 111 of the two selection terminals 111 and 112, and the common terminal 120 of the second switch 12 is electrically connected to the one selection terminal 122 of the two selection terminals 121 and 122. Additionally, in the high-frequency front end circuit 1a, when the operation in the carrier aggregation mode in which the first low noise amplifier 9 and the second low noise amplifier 10 are simultaneously used is performed, the common terminal 110 of the first switch 11 is electrically connected to the one selection terminal 112 of the two selection terminals 111 and 112, and the common terminal 120 of the second switch 12 is electrically connected to the one selection terminal 121 of the two selection terminals 121 and 122.

In the high-frequency front end circuit 1a, the second route r2 is formed in a case of the single mode in which one of the first power amplifier 4 and the second power amplifier 5 is used, or in a case of the single mode in which one of the first low noise amplifier 9 and the second low noise amplifier 10 is used, by both the first insulation switch S1 and the second insulation switch S2 being switched off (see FIG. 8 or 9). In the high-frequency front end circuit 1a, when the operation in the single mode in which the first power amplifier 4 is used is performed, the common terminal 110 of the first switch 11 is electrically connected to the one selection terminal 111 of the two selection terminals 111 and 112. In the high-frequency front end circuit 1a, when the operation in the single mode in which the second power amplifier 5 is used is performed, the common terminal 120 of the second switch 12 is electrically connected to the one selection terminal 122 of the two selection terminals 121 and 122. In the high-frequency front end circuit 1a, when the operation in the single mode in which the first low noise amplifier 9 is used is performed, the common terminal 110 of the first switch 11 is electrically connected to the one selection terminal 112 of the two selection terminals 111 and 112. In the high-frequency front end circuit 1a, when the operation in the single mode in which the second low noise amplifier 10 is used is performed, the common terminal 120 of the second switch 12 is electrically connected to the one selection terminal 121 of the two selection terminals 121 and 122.

In the high-frequency front end circuit 1a according to the second embodiment, as compared with the high-frequency front end circuit 1 according to the first embodiment, it is possible to suppress the impedance of the multiplexer 3 from affecting the impedance of each of the first filter 7 and the second filter 8 during the operation in the single mode.

Third Embodiment

Figure 10:
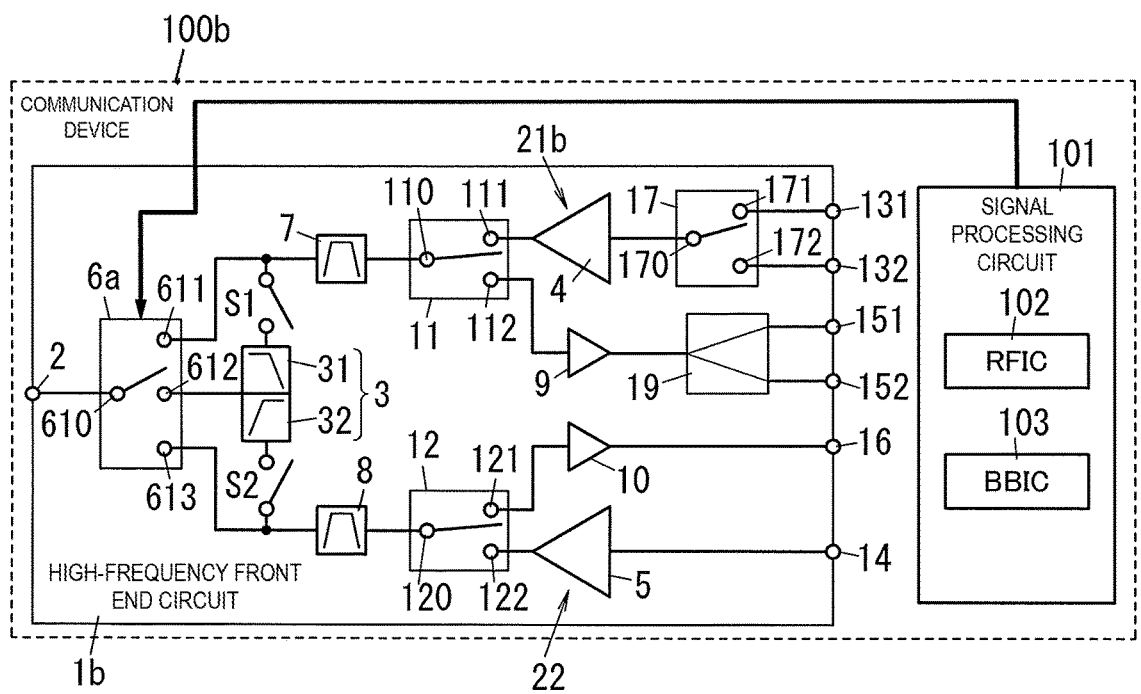
FIG. 10 is a circuit configuration diagram of a high-frequency front end circuit and a communication device including the high-frequency front end circuit according to a third embodiment of the present disclosure.

Hereinafter, a high-frequency front end circuit 1b and a communication device 100b including the high-frequency front end circuit according to a third embodiment will be described with reference to FIG. 10. Constituent elements of the high-frequency front end circuit 1b and the communication device 100b according to the third embodiment which are the same as those of the high-frequency front end circuit 1a and the communication device 100a according to the second embodiment are given the same reference numerals, and the description thereof will be omitted.

The high-frequency front end circuit 1b according to the third embodiment includes a first transmission/reception circuit 21b instead of the first transmission/reception circuit 21a of the high-frequency front end circuit 1a according to the second embodiment. The first transmission/reception circuit 21b includes a splitter 19 which is electrically connected to the output end of the first low noise amplifier 9, instead of the switch 18 of the first transmission/reception circuit 21a. With this, the high-frequency front end circuit 1b according to the third embodiment can support dual connectivity.

In the high-frequency front end circuit 1b according to the third embodiment, the first pass band of the first filter 7 includes the n77/n78 of the NR band of the 5G standard and the band 42/band 43/band 48 of the 3GPP LTE standard, and the second pass band of the second filter 8 includes the n79 of the NR band of the 5G standard.

Each of the above-described first to third embodiments is merely one of the various embodiments of the present disclosure. In the above-described first to third embodiments, various modifications can be made in accordance with design and the like.

For example, a mode for achieving simultaneous transmission and reception of a transmission signal and a reception signal (Duplex Mode) is not limited to the TDD and may be an FDD (Frequency Division Duplex) in which a frequency band is divided into a transmission band and a reception band and the transmission and reception is simultaneously performed.

Furthermore, the first transmission/reception circuit 21 and the second transmission/reception circuit 22 are each not limited to the configuration supporting both the transmission and the reception, and it is sufficient for the circuits to support at least the transmission. In other words, in the first transmission/reception circuit 21 and the second transmission/reception circuit 22, the first power amplifier 4 and the second power amplifier 5 are required constituent elements, but each of the first low noise amplifier 9 and the second low noise amplifier 10 is not the required constituent element.

In addition, it is sufficient for the high-frequency front end circuit 1 to be configured so as to be capable of supporting at least two uplinks, and the high-frequency front end circuit may be configured so as to be capable of supporting three uplinks, for example. In this case, the multiplexer 3 is not the diplexer but a triplexer. Additionally, in the high-frequency front end circuit 1a and the high-frequency front end circuit 1b as well, the multiplexer 3 is not limited to the diplexer, may be the triplexer, for example.

SUMMARY

The following aspects are disclosed from the embodiments or the like described above.

The high-frequency front end circuit (1; 1a; 1b) according to a first aspect includes the antenna terminal (2), the multiplexer (3), the first power amplifier (4), the second power amplifier (5), and the switch circuit (6; 6a). The multiplexer (3) is electrically connectable to the antenna terminal (2). The first power amplifier (4) is electrically connectable to the multiplexer (3) and amplifies the first transmission signal in the first frequency band. The second power amplifier (5) is electrically connectable to the multiplexer (3) and amplifies the second transmission signal in the second frequency band different from the first frequency band. The switch circuit (6; 6a) switches between the first route (r1) passing through the multiplexer (3) and the second route (r2) not passing through the multiplexer (3). In the high-frequency front end circuit (1; 1a; 1b) according to the first aspect, the first route (r1) is formed in a case of the carrier aggregation mode in which the first power amplifier (4) and the second power amplifier (5) are simultaneously used, and the second route (r2) is formed in a case of the single mode in which one of the first power amplifier (4) and the second power amplifier (5) is used.

The high-frequency front end circuit (1; 1a; 1b) according to the first aspect is capable of operating in each of the carrier aggregation mode and the single mode and capable of suppressing the insertion loss caused by the multiplexer (3) when operating in the single mode. Here, in the high-frequency front end circuit (1; 1a; 1b) according to the first aspect, when operating in the single mode, the first transmission signal or the second transmission signal does not pass through the multiplexer (3) and passes through the switch circuit (6; 6a) having a smaller insertion loss than that of the multiplexer (3). Accordingly, in the high-frequency front end circuit (1) according to the first aspect, the insertion loss of the signal route of each of the first transmission signal and the second transmission signal can be reduced as compared with the comparative example configured such that the first transmission signal or the second transmission signal passes through the multiplexer when operating in the single mode. In other words, in the high-frequency front end circuit (1; 1a; 1b) according to the first aspect, when operating in the single mode, transmission characteristics do not deteriorate by the insertion loss of the multiplexer (3).

In the high-frequency front end circuit (1; 1a; 1b) according to a second aspect, in the first aspect, the first route (r1) includes the main route (m1) which is the route for electrically connecting the antenna terminal (2) and the multiplexer (3). The second route (r2) includes the first bypass route (b1) which is the route for electrically connecting the antenna terminal (2) and the first power amplifier (4) without necessarily interposing the multiplexer (3), and the second bypass route (b2) which is the route for electrically connecting the antenna terminal (2) and the second power amplifier (5) without necessarily interposing the multiplexer (3). The switch circuit (6; 6a) alternatively switches among the main route (m1), the first bypass route (b1), and the second bypass route (b2).

In the high-frequency front end circuit (1; 1a; 1b) according to the second aspect, when the first transmission signal is transmitted through the first power amplifier (4) in the single mode and when the second transmission signal is transmitted through the second power amplifier (5) in the single mode, since the signals do not pass through the multiplexer (3), as compared with the case where the signals pass through the multiplexer (3), the insertion loss can be reduced.

The high-frequency front end circuit (1; 1a; 1b) according to a third aspect, in the first or second aspects, further includes the first low noise amplifier (9), the second low noise amplifier (10), the first filter (7), and the second filter (8). The first low noise amplifier (9) amplifies the first reception signal in the first frequency band. The second low noise amplifier (10) amplifies the second reception signal in the second frequency band. The first filter (7) is provided between the antenna terminal (2) and the first power amplifier (4) and the first low noise amplifier (9) and allows the first transmission signal and the first reception signal to pass therethrough. The second filter (8) is provided between the antenna terminal (2) and the second power amplifier (5) and the second low noise amplifier (10) and allows the second transmission signal and the second reception signal to pass therethrough.

The high-frequency front end circuit (1; 1a; 1b) according to the third aspect can support the carrier aggregation in at least one of the uplink and the downlink.

The high-frequency front end circuit (1; 1a; 1b) according to a fourth aspect, in the third aspect, further includes the first switch (11) and the second switch (12). The first switch (11) switches the connection relationship between the first filter (7) and the first power amplifier (4) and the first low noise amplifier (9). The second switch (12) switches the connection relationship between the second filter (8) and the second power amplifier (5) and the second low noise amplifier (10).

The high-frequency front end circuit (1; 1a; 1b) according to the fourth aspect can support the carrier aggregation by the TDD (Time Division Duplex) communication.

In the high-frequency front end circuit (1a; 1b) according to a fifth aspect, in the third or fourth aspect, the first filter (7) is provided between the multiplexer (3) and the first power amplifier (4) and the first low noise amplifier (9). The second filter (8) is provided between the multiplexer (3) and the second power amplifier (5) and the second low noise amplifier (10). The high-frequency front end circuit (1a; 1b) further includes the first insulation switch (S1) and the second insulation switch (S2). The first insulation switch (S1) is provided between the first filter (7) and the multiplexer (3). The second insulation switch (S2) is provided between the second filter (8) and the multiplexer (3). In the high-frequency front end circuit (1a; 1b), the first route (r1) is formed in a case of the carrier aggregation mode in which the first power amplifier (4) and the second power amplifier (5) are simultaneously used, or in a case of the carrier aggregation in which the first low noise amplifier (9) and the second low noise amplifier (10) are simultaneously used, by both the first insulation switch (S1) and the second insulation switch (S2) being switched on. In the high-frequency front end circuit (1a; 1b), the second route (r2) is formed in a case of the single mode in which one of the first power amplifier (4) and the second power amplifier (5) is used, or in a case of the single mode in which one of the first low noise amplifier (9) and the second low noise amplifier (10) is used, by both the first insulation switch (S1) and the second insulation switch (S2) being switched off.

In the high-frequency front end circuit (1a; 1b) according to the fifth aspect, it is possible to suppress the impedance of the multiplexer (3) from affecting the impedance of each of the first filter (7) and the second filter (8) during the operation in the single mode.

The high-frequency front end circuit (1b) according to a sixth aspect, in the fifth aspect, further includes the splitter (19) connected to the output end of the first low noise amplifier (9).

The high-frequency front end circuit (1b) according to the sixth aspect can support the dual connectivity.

In the high-frequency front end circuit (1b) according to a seventh aspect, in the sixth aspect, the first pass band of the first filter (7) includes the n77/n78 of the NR band of the 5G standard and the band 42/band 43/band 48 of the 3GPP LTE standard, and the second pass band of the second filter (8) includes the n79 of the NR band of the 5G standard.

In the high-frequency front end circuit (1; 1a; 1b) according to an eighth aspect, in the fourth or fifth aspect, the first pass band of the first filter (7) includes the n77/n78 of the NR band of the 5G standard. The second pass band of the second filter (8) includes the n79 of the NR band of the 5G standard.

The high-frequency front end circuit (1; 1a; 1b) according to the eighth aspect can support the carrier aggregation of the n77/n78 and the n79 of the NR band of the 5G standard.

The high-frequency front end circuit (1; 1a; 1b) according to a ninth aspect includes the antenna terminal (2), the multiplexer (3), the first low noise amplifier (9), the second low noise amplifier (10), and the switch circuit (6; 6a). The multiplexer (3) is electrically connectable to the antenna terminal (2). The first low noise amplifier (9) is electrically connectable to the multiplexer (3) and amplifies the first reception signal in the first frequency band. The second low noise amplifier (10) is electrically connectable to the multiplexer (3) and amplifies the second reception signal in the second frequency band different from the first frequency band. The switch circuit (6; 6a) switches between the first route (r1) passing through the multiplexer (3) and the second route (r2) not passing through the multiplexer (3). In the high-frequency front end circuit (1; 1a; 1b) according to the ninth aspect, the first route (r1) is formed in a case of the carrier aggregation mode in which the first low noise amplifier (9) and the second low noise amplifier (10) are simultaneously used, and the second route (r2) is formed in a case of the single mode in which one of the first low noise amplifier (9) and the second low noise amplifier (10) is used.

The high-frequency front end circuit (1; 1a; 1b) according to the ninth aspect is capable of operating in each of the carrier aggregation mode and the single mode and capable of suppressing the insertion loss caused by the multiplexer (3) when operating in the single mode. Here, in the high-frequency front end circuit (1; 1a; 1b) according to the ninth aspect, when operating in the single mode, the first reception signal or the second reception signal does not pass through the multiplexer (3) and passes through the switch circuit (6; 6a) having a smaller insertion loss than that of the multiplexer (3). Accordingly, in the high-frequency front end circuit (1; 1a; 1b) according to the ninth aspect, the insertion loss of the signal route of each of the first reception signal and the second reception signal can be reduced as compared with the comparative example configured such that the first reception signal or the second reception signal passes through the multiplexer when operating in the single mode. In other words, in the high-frequency front end circuit (1; 1a; 1b) according to the ninth aspect, when operating in the single mode, reception characteristics do not deteriorate by the insertion loss of the multiplexer (3).

The communication device (100; 100a; 100b) according to a tenth aspect includes the high-frequency front end circuit (1; 1a; 1b) according to any one of the first to ninth aspects, and the control circuit (signal processing circuit 101) which controls the switch circuit (6; 6a).

The communication device (100; 100a; 100b) according to the tenth aspect is capable of operating in each of the carrier aggregation mode and the single mode and capable of suppressing the insertion loss caused by the multiplexer (3) when operating in the single mode.

While embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A high-frequency front end circuit comprising:
   an antenna terminal;
   a multiplexer that is selectively electrically connected to the antenna terminal;
   a first power amplifier that is selectively electrically connected to the multiplexer and that is configured to amplify a first transmission signal in a first frequency band;
   a second power amplifier that is selectively electrically connected to the multiplexer and that is configured to amplify a second transmission signal in a second frequency band, the second frequency band being different from the first frequency band; and
   a switch circuit configured to selectively connect the antenna terminal to a first electrical path that passes through the multiplexer or a second electrical path that does not pass through the multiplexer,
   wherein when the high-frequency front end circuit operates in a carrier aggregation mode in which the first power amplifier and the second power amplifier are simultaneously used, the switch circuit is configured to selectively connect the antenna terminal to the first electrical path, and
   wherein when the high-frequency front end circuit operates in a single mode in which either the first power amplifier or the second power amplifier is used, the switch circuit is configured to selectively connect the antenna terminal to the second electrical path.

2. The high-frequency front end circuit according to claim 1, wherein:
   the first electrical path electrically connects the antenna terminal and the multiplexer,
   the second electrical path comprises:
     a first bypass path electrically connecting the antenna terminal and the first power amplifier without interposing the multiplexer, and
     a second bypass path electrically connecting the antenna terminal and the second power amplifier without interposing the multiplexer, and
   the switch circuit alternatively switches between the first electrical path, the first bypass path, and the second bypass path.

3. The high-frequency front end circuit according to claim 2, further comprising:
   a first low noise amplifier configured to amplify a first reception signal in the first frequency band;
   a second low noise amplifier configured to amplify a second reception signal in the second frequency band;
   a first filter provided between the antenna terminal and the first power amplifier and between the antenna terminal and the first low noise amplifier, and that is configured to pass the first transmission signal and the first reception signal within a first pass band; and
   a second filter provided between the antenna terminal and the second power amplifier and between the antenna terminal and the second low noise amplifier, and that is configured to pass the second transmission signal and the second reception signal within a second pass band.

4. The high-frequency front end circuit according to claim 1, further comprising:

a first low noise amplifier configured to amplify a first reception signal in the first frequency band;
a second low noise amplifier configured to amplify a second reception signal in the second frequency band;
a first filter that is provided between the antenna terminal and the first power amplifier and between the antenna terminal and the first low noise amplifier, and that is configured to pass the first transmission signal and the first reception signal within a first pass band; and
a second filter that is provided between the antenna terminal and the second power amplifier and between the antenna terminal and the second low noise amplifier, and that is configured to pass the second transmission signal and the second reception signal within a second pass band.

5. The high-frequency front end circuit according to claim 4, further comprising:
a first switch configured to selectively connect the first filter to the first power amplifier or the first low noise amplifier; and
a second switch configured to selectively connect the second filter to the second power amplifier or the second low noise amplifier.

6. The high-frequency front end circuit according to claim 5,
wherein the first pass band of the first filter includes an n77/n78 of an NR band of the 5G standard, and
the second pass band of the second filter includes an n79 of the NR band of the 5G standard.

7. The high-frequency front end circuit according to claim 4, wherein:
the first filter is provided between the multiplexer and the first power amplifier and between the multiplexer and the first low noise amplifier,
the second filter is provided between the multiplexer and the second power amplifier and between the multiplexer and the second low noise amplifier,
the high-frequency front end circuit further comprises:
a first insulation switch that is provided between the first filter and the multiplexer, and
a second insulation switch that is provided between the second filter and the multiplexer,
when the high-frequency front end circuit operates in the carrier aggregation mode in which the first power amplifier and the second power amplifier are simultaneously used or a carrier aggregation mode in which the first low noise amplifier and the second low noise amplifier are simultaneously used, both the first insulation switch and the second insulation switch are switched on and form portions of the first electrical path, and
when the high-frequency front end circuit operates in the single mode in which one of the first power amplifier and the second power amplifier is used or a single mode in which one of the first low noise amplifier and the second low noise amplifier is used, both the first insulation switch and the second insulation switch are switched off.

8. The high-frequency front end circuit according to claim 7, further comprising:
a splitter connected to an output of the first low noise amplifier.

9. The high-frequency front end circuit according to claim 8,
wherein the first pass band of the first filter includes an n77/n78 of an NR band of the 5G standard and a band 42/a band 43/a band 48 of the 3GPP LTE standard, and the second pass band of the second filter includes an n79 of the NR band of the 5G standard.

10. A communication device comprising:
the high-frequency front end circuit according to claim 1; and
a control circuit configured to control the switch circuit.

11. A high-frequency front end circuit comprising:
an antenna terminal;
a multiplexer that is selectively electrically connected to the antenna terminal;
a first low noise amplifier that is selectively electrically connected to the multiplexer and that is configured to amplify a first reception signal in a first frequency band;
a second low noise amplifier that is selectively electrically connected to the multiplexer and that is configured to amplify a second reception signal in a second frequency band, the second frequency band being different from the first frequency band; and
a switch circuit configured to selectively connect the antenna terminal to a first electrical path that passes through the multiplexer or a second electrical path that does not pass through the multiplexer,
wherein when the high-frequency front end circuit operates in a carrier aggregation mode in which the first low noise amplifier and the second low noise amplifier are simultaneously used, the switch circuit is configured to selectively connect the antenna terminal to the first electrical path, and
wherein when the high-frequency front end circuit operates in a single mode in which either the first low noise amplifier or the second low noise amplifier is used, the switch circuit is configured to selectively connect the antenna terminal to the second electrical path.

12. The high-frequency front end circuit according to claim 11, wherein:
the first electrical path electrically connects the antenna terminal and the multiplexer,
the second electrical path comprises:
a first bypass path electrically connecting the antenna terminal and the first low noise amplifier without interposing the multiplexer, and
a second bypass path electrically connecting the antenna terminal and the second low noise amplifier without interposing the multiplexer, and
the switch circuit alternatively switches between the first electrical path, the first bypass, and the second bypass.

13. A communication device comprising:
the high-frequency front end circuit according to claim 11; and
a control circuit configured to control the switch circuit.

14. A high-frequency front end circuit comprising:
an antenna terminal;
a multiplexer that is selectively electrically connected to the antenna terminal;
a first power amplifier that is selectively electrically connected to the multiplexer and that is configured to amplify a first transmission signal in a first frequency band;
a second power amplifier that is selectively electrically connected to the multiplexer and that is configured to amplify a second transmission signal in a second frequency band, the second frequency band being different from the first frequency band; and
a switch circuit configured to selectively switch a connection of the antenna terminal between (1) a first electrical path that passes through the multiplexer and (2) a second electrical path that does not pass through the multiplexer, wherein when the high-frequency front end circuit operates in a carrier aggregation mode in which the first power amplifier and the second power amplifier are simultaneously used, the switch circuit is configured to selectively connect the antenna terminal to the first electrical path, and wherein when the high-frequency front end circuit operates in a single mode in which either the first power amplifier or the second power amplifier is used, the switch circuit is configured to selectively connect the antenna terminal to the second electrical path.

* * * * *